United States Patent [19]
Perttunen et al.

[11] Patent Number: 5,928,753
[45] Date of Patent: Jul. 27, 1999

[54] FOLDABLE ARTICLE

[75] Inventors: Cary D. Perttunen, Shelby Township, Mich.; William L. Reber, Schaumburg, Ill.

[73] Assignee: Motorola, Inc., Schaumburg, Ill.

[21] Appl. No.: 09/070,284

[22] Filed: Apr. 30, 1998

Related U.S. Application Data

[63] Continuation of application No. 08/788,153, Jan. 24, 1997, Pat. No. 5,882,763, which is a continuation-in-part of application No. 08/744,338, Nov. 7, 1996, abandoned.

[51] Int. Cl.[6] ..................................................... B32B 3/04
[52] U.S. Cl. ........................... 428/77; 428/130; 428/192; 283/34; 402/4
[58] Field of Search ........................... 428/77, 130, 192; 283/34; 402/4

[56] References Cited

U.S. PATENT DOCUMENTS

| | | | |
|---|---|---|---|
| 1,687,304 | 10/1928 | Morris | 283/34 |
| 5,156,898 | 10/1992 | McDonald | 428/100 |

*Primary Examiner*—Alexander Thomas
*Attorney, Agent, or Firm*—James E. Gauger

[57] ABSTRACT

A foldable article comprises a sheet of material (20) having a first plurality of concertina folds (22) and a second plurality of concertina folds (24). The second plurality of concertina folds (24) are oriented transverse to the first plurality of concertina folds (22). A first tab (30) is disposed at a first edge of the sheet of material.

18 Claims, 6 Drawing Sheets

FOLDABLE ARTICLE

RELATED APPLICATIONS

The present application is a continuation of U.S. application Ser. No. 08/788,153, filed on Jan. 24, 1997, now U.S. Pat. No. 5,882,763, which is hereby incorporated by reference, and priority thereto for common subject matter is hereby claimed which is a continuation-in-part of the following application which is assigned to the same assignee as the present application:

"Method, System, and Article of Manufacture for Producing a Network Navigation Device", having Docket No. MNE00494 and U.S. Ser. No. 08/744,338, filed Nov. 7, 1996, abandoned.

The subject matter of the above-identified related application is hereby incorporated by reference into this application.

FIELD OF THE INVENTION

The present invention relates to foldable articles which use folded sheets of material.

BACKGROUND OF THE INVENTION

U.S. Pat. No. 5,156,898 to McDonald discloses a folded sheet of paper or like material having a first set of concertina folds and a second set of concertina folds. The two sets of concertina folds define opposite corner segments of the sheet. Disposed at the opposite corner segments are two stiff portions, one at each corner segment. The two stiff portions are utilized for protecting the sheet and for folding and unfolding the sheet.

The two stiff portions are slightly larger on each side than the corner segments to facilitate grasping thereof by an individual. In particular, the individual grasps opposite edges of one stiff portion using his/her right hand and the other stiff portion using his/her left hand. Once grasped, the individual can fold and unfold the sheet without having to release the two stiff portions.

The McDonald patent discloses having the first set of folds consist of an odd number of folds, and the second set of folds consist of an even number of folds. The McDonald patent further states that the most suitable folding is to have five folds in the first set and two folds in the second set.

Although the McDonald patent provides a foldable article, it would be desirable if the article provided a user with clear and easy to follow guidance as to how to fold and unfold the article. Accordingly, there is a need for a foldable article that is more intuitive to grasp and is easier to fold and unfold.

BRIEF DESCRIPTION OF THE DRAWINGS

The invention is pointed out with particularity in the appended claims. However, other features of the invention will become more apparent and the invention may be best understood by referring to the following detailed description in conjunction with the accompanying drawings in which:

DETAILED DESCRIPTION OF A PREFERRED EMBODIMENT

Embodiments of the present invention address the problems of the prior art by providing foldable articles with folded sheets which are advantageously more intuitive for any individual to grasp, to unfold, and to fold. Further, embodiments of the folded sheets advantageously facilitate folding and unfolding using less wrist motion.

Figure 1:
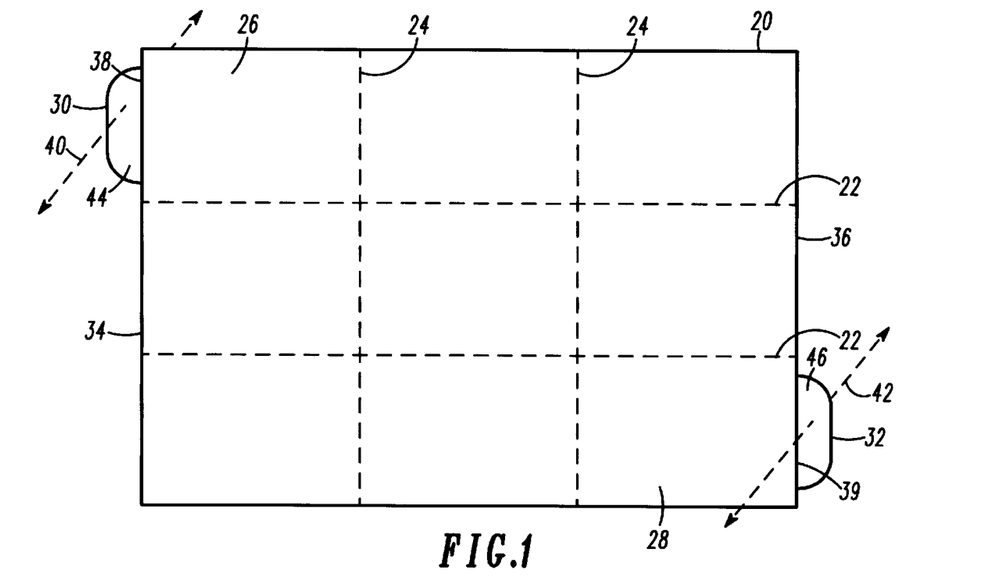
FIG. 1 is a general diagram that illustrates an embodiment of a foldable article in accordance with the present invention.

FIG. 1 illustrates an embodiment of a foldable article in accordance with the present invention. The article includes a sheet of material 20. The sheet of material 20 can be formed of paper, plastic, cardboard, or other printing material. Generally, the sheet of material 20 can be formed of any material, including but not limited to dielectric materials and nonmagnetic materials. Further, it is noted that the sheet of material 20 need not be homogeneous, i.e. two or more materials can be utilized to form the sheet of material 20.

The sheet of material 20 can be sized in accordance with a standard size of printing material, or can have a custom size. Examples of sizes of the sheet of material 20 include, but are not limited to, any letter-sized paper such as 8.5 inches by 11 inches paper, legal-sized paper such as 8.5 inches by 14 inches paper, A4-sized paper, and 11 inches by 17 inches paper. Regardless of its planar dimensions, it is preferred that the sheet of material 20 be substantially flat. The material and the thickness of the sheet of material 20 can be selected to provide a desired stiffness and flexibility.

The article includes a first plurality of concertina folds 22 and a second plurality of concertina folds 24 in the sheet of material 20. The first plurality of concertina folds 22 is oriented transverse to, and preferably perpendicular to, the second plurality of concertina folds 24.

The first plurality of concertina folds 22 and the second plurality of concertina folds 24 divide the sheet of material 20 into a plurality of segments. The plurality of segments includes a first corner segment 26 and a second corner segment 28. The first corner segment 26 is diagonally opposite to the second corner segment 28.

It is preferred that the first plurality of concertina folds 22 consists of an even number of folds, and that the second plurality of concertina folds 24 consists of an even number of folds. Utilizing an even number of folds in the first plurality of concertina folds 22 is advantageous in reducing a wrist motion for completely folding and completely unfolding the sheet of material 20. In an exemplary embodiment, the first plurality of concertina folds 22 consists of two folds and the second plurality of concertina folds 24 consists of two folds. It is noted, however, that the first plurality of concertina folds 22 and the second plurality of concertina folds 24 can consist of any number of folds in general.

The article includes a first tab 30 and a second tab 32 for grasping by an individual. The first tab 30 is disposed at a first edge 34 of the sheet of material 20. The second tab 32 is disposed at a second edge 36 of the sheet of material 20. Preferably, the first edge 34 is opposite to the second edge 36. However, the first edge 34 need not be opposite to the second edge 36. For example, the first edge 34 and the second edge 36 can be adjacent edges of the sheet of material 20.

Preferably, the first tab 30 projects beyond a linear portion 38 of one and only one edge, such as the first edge 34, of the sheet of material 20. Similarly, it is preferred that the second tab 32 projects beyond a linear portion 39 of one and only one edge, such as the second edge 36, of the sheet of material 20. Optionally, the first tab 30 and the second tab 32 can be folded to provide a smaller profile when the foldable article is completely folded. Here, the first tab 30 can be folded along or near the linear portion 38 and the second tab 32 can be folded along or near the linear portion 39.

It is also preferred that the first tab 30 be associated with the first corner segment 26 and the second tab 32 be associated with the second corner segment 28. Typically, the first tab 30 is sized to be smaller than the first corner segment 26 and the second tab 32 is sized to be smaller that the second corner segment 28.

The first tab 30 and the second tab 32 are grasped by the individual to fold and to unfold the sheet of material 20. The first tab 30 and the second tab 32 facilitate grasping along axes 40 and 42, respectively, which are transverse to a surface of the sheet of material 20.

The first tab 30 defines two major surfaces for grasping, including a first surface 44 and a second surface (not shown) (the second surface being opposite to the first surface 44). To grasp the first tab 30 along the axis 40, a thumb of the individual contacts the first surface 40 while at least one finger from the same hand as the thumb contacts the second surface.

In a similar manner, the second tab 32 defines two major surfaces for grasping, including a first surface 46 and a second surface (the second surface being opposite to the first surface 46). To grasp the second tab 32 along the axis 42, another thumb of the individual contacts the first surface 46 while at least one finger from the same hand contacts the second surface. In this way, the first tab 30 can be grasped by a first hand of the individual while the second tab 32 is simultaneously grasped by a second hand of the individual.

The first tab 30 and the second tab 32 can be formed by the same material as the sheet of material 20. Alternatively, the first tab 30 and the second tab can be formed using a different material than the sheet of material 20.

The sheet of material 20, the first tab 30, and the second tab 32 can be formed of a unitary sheet. Alternatively, the first tab 30 and the second tab 32 can be attached to the sheet of material 20 after the sheet of material 20 has been formed.

Regardless of the material utilized, the first tab 30 and the second tab 32 can have substantially the same thickness and/or substantially the same stiffness as the sheet of material 20. Alternatively, the first tab 30 and the second tab 32 can have a different thickness or a different stiffness as the sheet of material 20.

In general, the first tab 30 and the second tab 32 can have any of a variety of shapes, including but not limited to a rectangular shape, a curved shape, and a bell shape. As another alternative, the first tab 30 and the second tab 32 have the form of handles. Regardless of their shape, the first tab 30 and the second tab 32 can be perforated for removal from the sheet of material 20.

Figure 2:
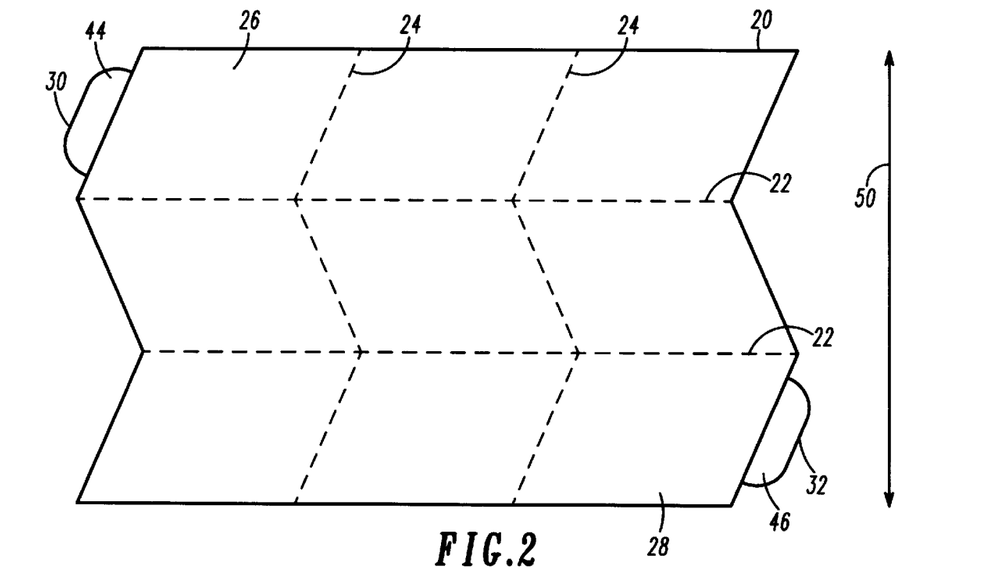
FIG. 2 is an illustration of the article of FIG. 1 in a first partially-folded state.

FIG. 2 is an illustration of the article of FIG. 1 in a first partially-folded state. The first partially-folded state is attained as the individual begins to move at least one of the first tab 30 and the second tab 32 parallel to a first axis 50. The first axis 50 is transverse to, and preferably perpendicular to, the orientation of the first plurality of concertina folds 22.

The individual can move both the first tab 30 and the second tab 32 toward one another along the first axis 50 to reach the first partially-folded state. As illustrated, the sheet of material 20 folds along the first plurality of concertina folds 22 in the first partially-folded state.

Figure 3:
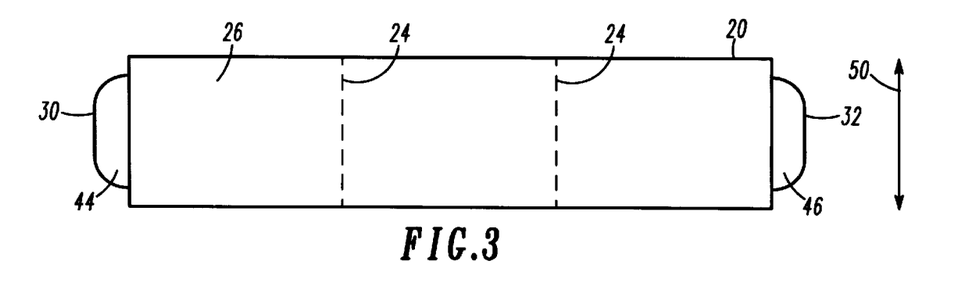
FIG. 3 is an illustration of the article of FIG. 1 in a second partially-folded state.

FIG. 3 is an illustration of the article of FIG. 1 in a second partially-folded state. From the first partially-folded state in FIG. 2, the second partially-folded state is attained as the individual continues to move at least one of the first tab 30 and the second tab 32 along a path parallel to the first axis 50. As illustrated, the sheet of material 20 is completely folded along the first plurality of concertina folds 22 in the second partially-folded state.

Figure 4:
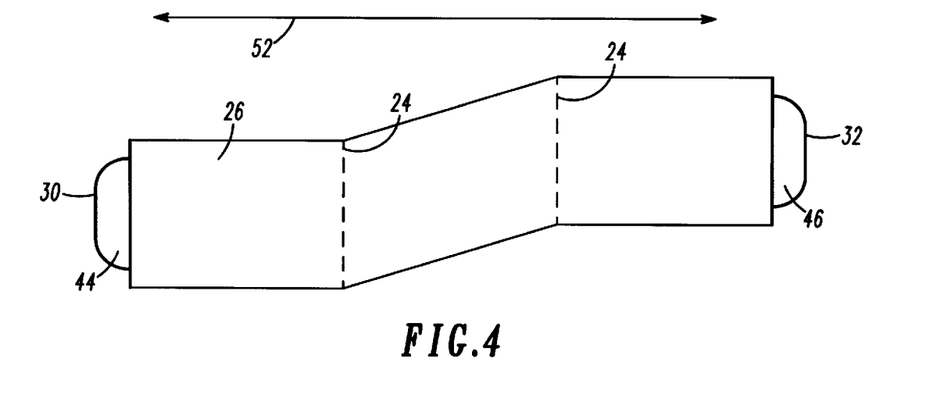
FIG. 4 is an illustration of the article of FIG. 1 in a third partially-folded state.

FIG. 4 is an illustration of the article of FIG. 1 in a third partially-folded state. From the second partially-folded state in FIG. 3, the third partially-folded state is attained as the individual begins to move at least one of the first tab 30 and the second tab 32 parallel to a second axis 52. The individual can move both the first tab 30 and the second tab 32 toward one another along the second axis 52 to reach the third partially-folded state. The second axis 52 is transverse to, and preferably perpendicular to, the second plurality of concertina folds 24. As illustrated, the sheet of material 20 folds along the second plurality of concertina folds 24 in the third partially-folded state.

Figure 5:
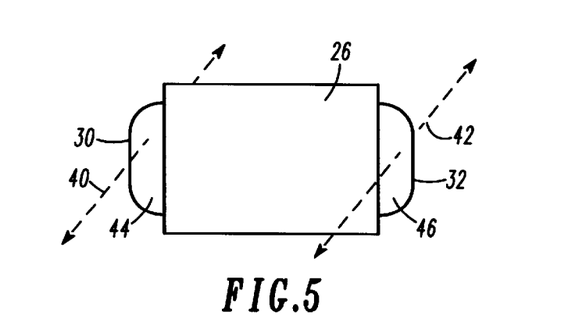
FIG. 5 is an illustration of the article of FIG. 1 in a completely-folded state.

FIG. 5 is an illustration of the article of FIG. 1 in a completely-folded state. From the third partially-folded state in FIG. 4, the completely-folded state is attained as the individual continues to move at least one of the first tab 30 and the second tab 32 along a path parallel to the second axis 52. As illustrated, the sheet of material 20 is completely folded along the second plurality of concertina folds 24, as well as along the first plurality of concertina folds 22, in the completely-folded state.

Advantageously, the two major surfaces of the first tab 30 and the two major surfaces of the second tab 32 are exposed for grasping when the sheet of material 20 is completely folded along the first plurality of concertina folds 22 and the second plurality of concertina folds 24. As a result, the first tab 30 and the second tab 32 facilitate grasping along the axes 40 and 42 when the sheet of material 20 is completely folded. Further, the first tab 30 can be grasped by the first hand of the individual while the second tab 32 is simultaneously grasped by the second hand of the individual regardless of the folded state of the article.

The individual can unfold the article by reversing the process described with reference to FIGS. 1 to 5. Specifically, the article is unfolded by, firstly, moving at least one of the first tab 30 and the second tab 32 apart along the second axis 52, and secondly, moving at least one of the first tab 30 and the second tab 32 apart along the first axis 50.

Figure 6:
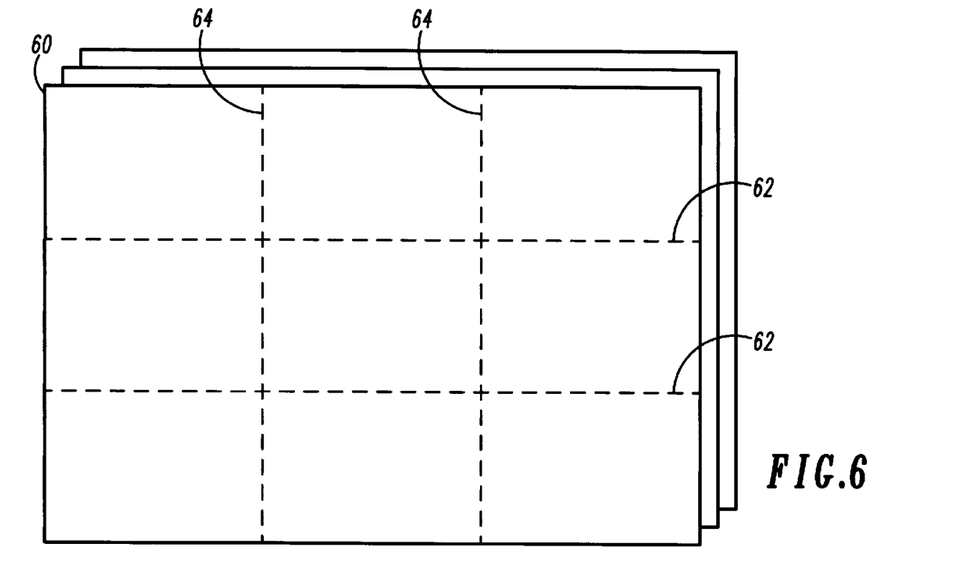
FIG. 6 is a general diagram that illustrates a plurality of sheets utilized to form embodiments of foldable articles in accordance with the present invention.

FIG. 6 illustrates a plurality of sheets 60 utilized to form embodiments of foldable articles in accordance with the present invention. Preferably, each of the plurality of sheets 60 includes a like embodiment of a sheet of material described with reference to FIG. 1. In particular, each of the plurality of sheets 60 has a first plurality of concertina folds 62 and a second plurality of concertina folds 64 such as those described with reference to FIG. 1.

The sheets 60 are stacked in an unfolded state to facilitate use in a hard copy device. Examples of the hard copy device include, but are not limited to, a typewriter, a printer such as a laser printer or an ink jet printer, and a fax machine. To further facilitate use in a hard copy device, it is preferred that the sheets 60 be sized in accordance with a standard paper size.

The sheets 60 can be placed into a paper tray or a feed slot of the hard copy device. The hard copy device prints visual information, such as textual information and/or graphical information onto the sheets 60. The hard copy device can be driven by a computer or a like processing apparatus. The computer can utilize software such as a client program, a browser program, a word processing program, or a desktop publishing program for initiating or assisting the hard copy device in printing the visual information to the sheets 60. Embodiments of methods and systems for writing the visual information to each of the sheets 60 are described in the copending application entitled "Method, System, and Article of Manufacture for Producing a Network Navigation Device" which is incorporated by reference into the disclosure of the present application.

Figure 7:
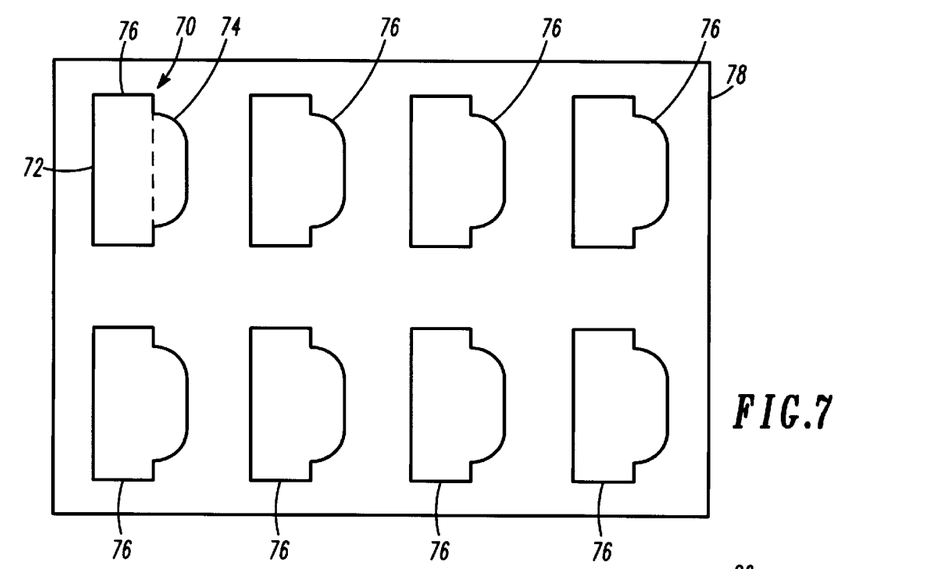
FIG. 7 is a general diagram that illustrates a first embodiment of a tab which can be applied to a sheet of material to form embodiments of foldable articles in accordance with the present invention.

FIG. 7 illustrates a first embodiment of a tab 70 which can be applied to a sheet of material to form embodiments of foldable articles in accordance with the present invention. The tab 70 includes a first portion 72 and a second portion 74. The first portion 72 includes an adhesive backing to apply the tab 70 to the sheet of material. Preferably, the first portion 72 is transparent so that visual information printed on the sheet can be seen therethrough. The second portion 74 provides two surfaces which project beyond an edge of the sheet of material. One embodiment of a tab of this type is based upon Post-It™ Brand Tape Flags from 3M Corporation. Here, the adhesive backing of the first portion 72 can be removed from the sheet of material for one or more times of reuse.

The tab 70 is included in a plurality of like tabs 76 supported by a backing sheet 78. The plurality of like tabs 76 are attached to the backing sheet 78 by the adhesive backing of the first portion 72. The backing sheet 78 can have a size such as those listed for the sheet of material 20, and be formed of one or more materials described for the sheet of material 20. The backing sheet 78 supporting the tabs 76 can be inserted into a hard copy device such as those previously listed. Here, the hard copy device can be utilized to print visual information onto the tabs.

Figure 8:
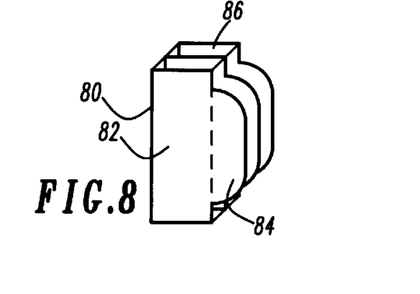
FIG. 8 is a general diagram that illustrates a second embodiment of a tab which can be applied to a sheet of material to form embodiments of foldable articles in accordance with the present invention.

FIG. 8 illustrates a second embodiment of a tab 80 which can be applied to a sheet of material to form embodiments of foldable articles in accordance with the present invention.

The tab 80 includes a first portion 82 such as the first portion 72 described with reference to FIG. 7, and a second portion 84 such as the second portion 74 described with reference to FIG. 7. The tab 80 is included in a plurality of like tabs 86 stacked to form a pad. An individual can peel one or more tabs from the pad for application to a sheet of material to form an embodiment of a foldable article in accordance with the present invention.

The sheets 60 described with reference to FIG. 6 along with the tabs described with reference to FIG. 7 or FIG. 8 are advantageous for producing foldable articles having printed information thereon using widely-available office equipment.

Figure 9:
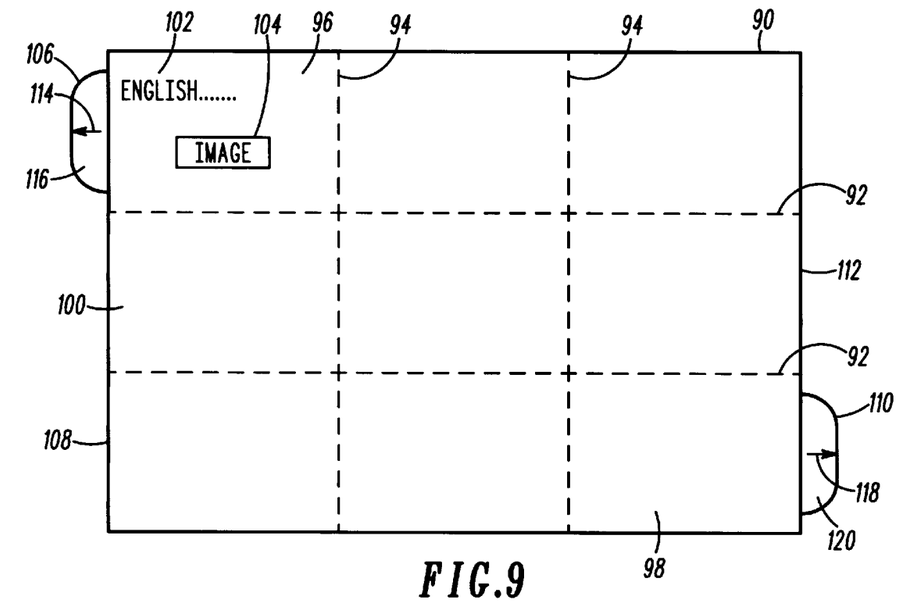
FIG. 9 is a general diagram that illustrates an embodiment of a foldable article having printed information supported thereby.

FIG. 9 illustrates an embodiment of a foldable article having printed information supported thereby. The foldable article includes a sheet of material 90 having a first plurality of concertina folds 92 and a second plurality of concertina folds 94. The first plurality of concertina folds 92 and the second plurality of concertina folds 94 divide the sheet of material 90 into a plurality of segments, including a first corner segment 96 and a second corner segment 98.

A first surface 100 of the sheet of material 90 supports printed information such as textual information 102 and/or graphical information such as an image 104. Although illustrated to be supported at the first corner segment 96, the printed information including the textual information 102 and/or the graphical information can be located anywhere on the first surface 100.

It is preferred that the first corner segment 96 support indicia that indicates an orientation of the foldable article for reading of the printed information by an individual. The indicia can include textual information, such as the textual information 102, which naturally provides a reading orientation for the printed information. Alternatively, the indicia can include graphical information, such as the image 104, having an intuitive top/bottom orientation or an intuitive right/left orientation.

The foldable article includes a first tab 106 disposed at a first edge 108 of the sheet of material 90, and a second tab 110 disposed at a second edge 112 of the sheet of material 90. The foldable article further includes indicia associated with at least one of the first tab 106 and the second tab 110 to indicate to an individual how to fold and/or unfold the sheet of material 90. The indicia can include a first mark 114 on a first surface 116 of the first tab 106, and a second mark 118 on a first surface 120 of the second tab 110. The first mark 114 and the second mark 118 can have the form of arrows oriented parallel to the first plurality of concertina folds 92 and transverse to the second plurality of concertina folds 94. The arrows indicate directions for pulling at least one of the first tab 106 and the second tab 110 to unfold the sheet of material 90.

Figure 10:
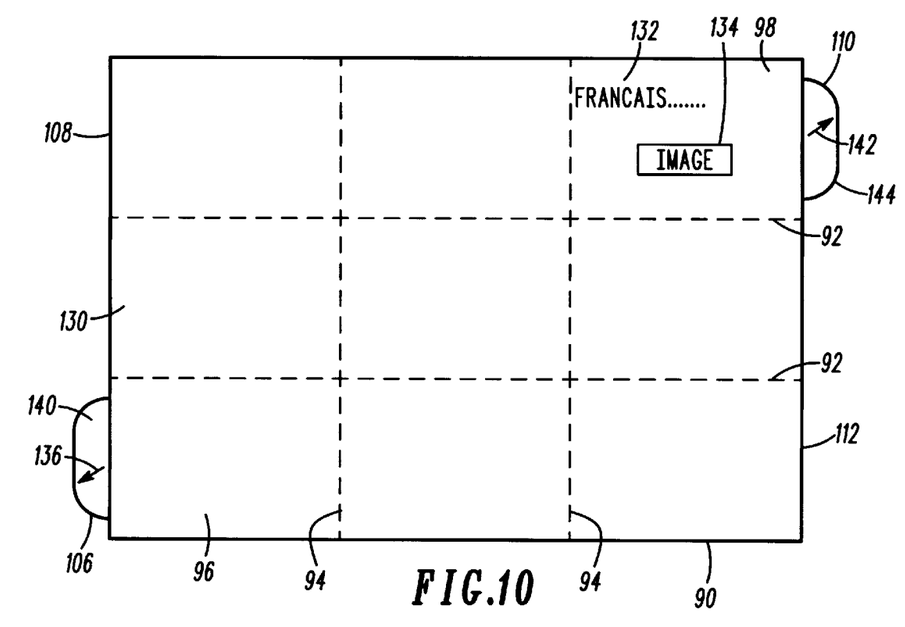
FIG. 10 is a general diagram that illustrates an opposite side of the embodiment of the foldable article of FIG. 9.

FIG. 10 illustrates an opposite side of the embodiment of the foldable article of FIG. 9. A second surface 130 of the sheet of material 90 is opposite to the first surface 100. The second surface 130 supports printed information such as textual information 132 and/or graphical information such as an image 134. As illustrated, the textual information 132 on the second surface 130 can include words in a different language than the textual information 102 on the first surface 100. One application of the foldable article is to include instructions in a first language on the first surface 100, and the same instructions in a second language on the second surface 130.

Although illustrated to be supported at the second corner segment 98, the printed information including the textual information 132 and/or the graphical information can be located anywhere on the second surface 130. It is preferred that the second corner segment 98 support indicia at the second surface 130 that indicates an orientation for reading the printed information.

The foldable article further includes indicia viewable from the opposite side to indicate how to fold and/or unfold the sheet of material 90. The indicia can include a third mark 136 on a second surface 140 of the first tab 106, and a fourth mark 142 on a second surface 144 of the second tab 110. As an alternative to the marks illustrated in FIG. 9, the third mark 136 and the fourth mark 142 have the form of arrows oriented transverse to both the first plurality of concertina folds 92 and the second plurality of concertina folds 94. The arrows indicate directions for pulling at least one of the first tab 106 and the second tab 110 to unfold the sheet of material 90.

Figure 11:
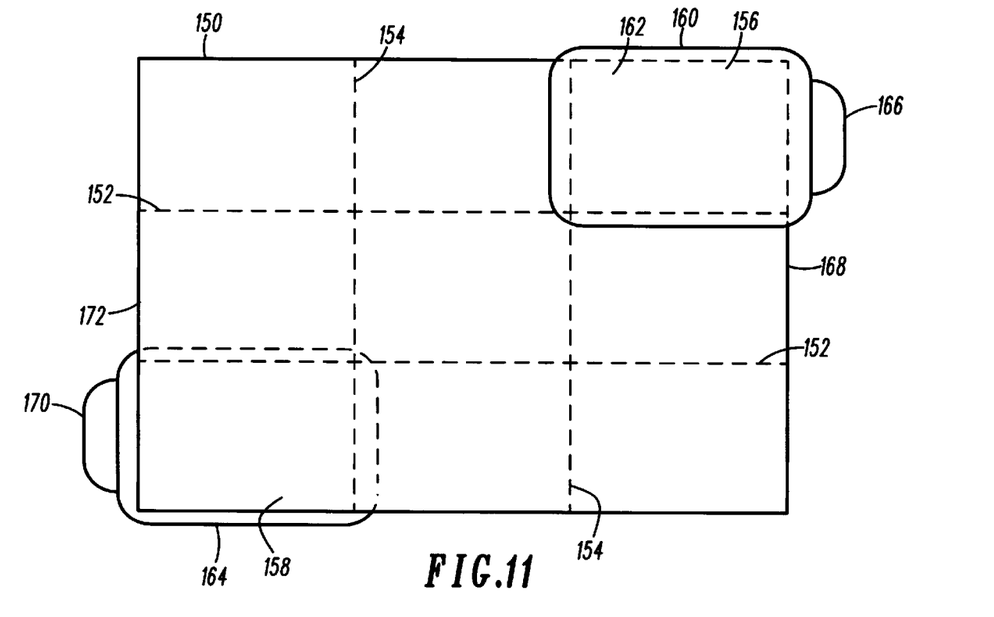
FIG. 11 is a general diagram that illustrates another embodiment of a foldable article in accordance with the present invention.

FIG. 11 illustrates another embodiment of a foldable article in accordance with the present invention. The foldable article includes a sheet 150 of a first material. The sheet 150 has a first plurality of concertina folds 152 and a second plurality of concertina folds 154 which define a first corner segment 156 and a second corner segment 158.

A first stiff portion 160 is mounted to the first corner segment 156 at a first surface 162 of the sheet 150. A second stiff portion 164 is mounted to the second corner segment 158 at a second surface opposite to the first surface 162 of the sheet 150. The first stiff portion 160 and the second stiff portion 164 are formed of a rigid material or a semi-rigid material such as cardboard or plastic. The first stiff portion 160 is slightly larger than the first corner segment 156 in at least one dimension. The second stiff portion 164 is slightly larger than the second corner segment 158 in at least one dimension. When the sheet 150 is in a completely folded state, the first stiff portion 160 and the second stiff portion 164 are located on opposed outer surfaces.

A first tab 166 is disposed at a first edge 168 of the sheet 150 and a second tab 170 is disposed at a second edge 172 of the sheet 150. The first tab 166 can be mounted to either the first stiff portion 160 or the sheet 150. Similarly, the second tab 170 can be mounted to either the second stiff portion 164 or the sheet 150. The first tab 166 and the second tab 170 can be formed of a different material than the first stiff portion 160 and the second stiff portion 164. Alternatively, the first tab 166 and the second tab 170 can be formed of the same material as the first stiff portion 160 and the second stiff portion 164. The first tab 166 and the first stiff portion 160 can be formed of a first unitary member, and the second tab 170 and the second stiff portion 164 can be formed of a second unitary member.

Optionally, at least one of the first tab 166 and the first stiff portion 160 can support indicia to indicate to an individual how to fold and/or unfold the sheet of material. Similarly, at least one of the second tab 170 and the second stiff portion 164 can support like indicia as described with reference to FIGS. 9 and 10.

In general, any of the embodiments of the folded sheet described in U.S. Pat. No. 5,156,898 to McDonald, which is hereby incorporated by reference into the disclosure of the present application, can be augmented with at least one tab as described herein to assist users in folding and unfolding the sheet.

Figure 12:
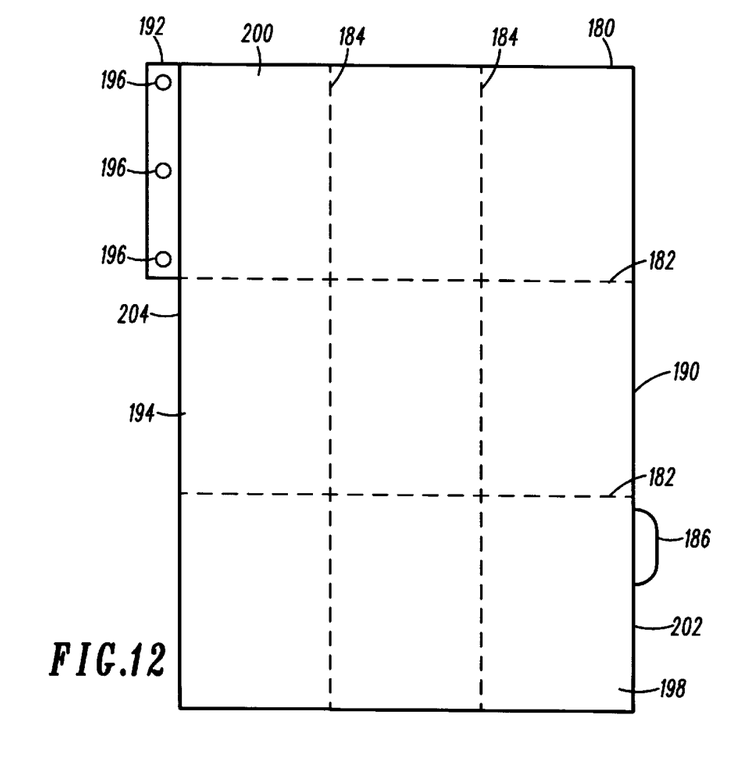
FIG. 12 is a general diagram that illustrates a further embodiment of a foldable article in accordance with the present invention.

FIG. 12 illustrates a further embodiment of a foldable article in accordance with the present invention. The foldable article includes a sheet 180 having a first plurality of concertina folds 182 and a second plurality of concertina folds 184. A first tab 186 is disposed at a first edge 190 of the sheet 180. A second tab 192 is disposed at a second edge 194 of the sheet 180.

The second tab 192 is a mounting tab that may be used to mount, bind, or affix the foldable article to an object or to a support member. With the foldable article supported at the second tab 192, the first tab 186 can be grasped by an individual to fold and to unfold the sheet 180.

As illustrated, the second tab 192 optionally defines a plurality of holes 196 for receiving a plurality of binding rings. Here, the foldable article can be supported by a multi-ring binder such as those included in a personal organizer or a personal planner. It is noted that the number of holes 196 defined by the second tab 192 is selected in dependence upon the number of rings in the binder.

The sheet 180 can include printed information for use with a personal organizer or a personal planner. The printed information can include a calendar, a map, a day planner, a to-do list, a future planning list, telephone numbers, addresses, and/or notes. Advantageously, the sheet 180 can assume a profile which fits within the personal organizer when in a folded state, and can support any combination of the aforementioned information which is viewable in an unfolded state. For example, the sheet 180 can support a multi-month planner, such as a full-year planner, on a single page.

It is noted that the second tab 192 can be mounted, bound, affixed, or supported with or without the holes 196. For example, the second tab 192 can be bound to a spine of a book or a magazine. In another application, the second tab 192 can be mounted to a portion of an automobile such as a steering wheel, a dashboard, or a visor. Here, the sheet 180 can advantageously support a map or the like which can be folded and unfolded by a driver using only one hand.

It is preferred that: (i) the first tab 186 be associated with a first corner segment 198; (ii) the second tab 92 be associated with a second corner segment 200 diagonally opposite to the first corner segment 198; (iii) the first plurality of concertina folds 182 consists of an even number of folds; (iv) the second plurality of concertina folds 184 consists of an even number of folds; (v) the first tab 186 projects beyond a linear portion 202 of the first edge 190; and (vi) the second tab 192 projects beyond a linear portion 204 of the second edge 194. It is also preferred that the first corner segment 198 be located in front of the second corner segment 200 when the sheet 180 is in a completely-folded state. The sheet 180, the first tab 186, and the second tab 192 can be shaped, sized, and formed of materials in accordance with other described embodiments of the present invention.

Figure 13:
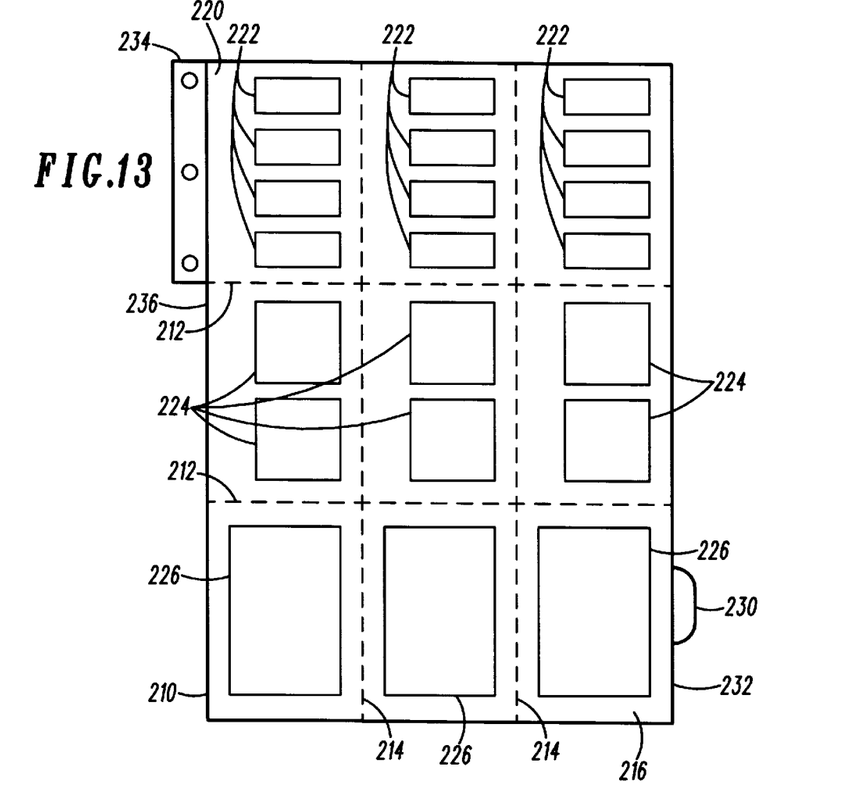
FIG. 13 is a general diagram that illustrates a still further embodiment of a foldable article in accordance with the present invention.

FIG. 13 illustrates a still further embodiment of a foldable article in accordance with the present invention. The foldable article includes a sheet 210 having a first plurality of concertina folds 212 and a second plurality of concertina folds 214. The first plurality of concertina folds 212 and the second plurality of concertina folds 214 divide the sheet 210 into a plurality of segments or panels including a first corner segment 216 and a second corner segment 220.

The sheet 210 includes a plurality of pockets or sleeves, including sleeves 222, sleeves 224, and sleeves 226. The sleeves 222 have a first size for receiving and containing card-shaped objects such as business cards, credit cards, identification cards, and the like. The sleeves 224 have a second size for receiving and containing storage media such as computer diskettes. The sleeves 226 have a third size for receiving and containing larger objects such as pages of printed material, and storage media such as compact disks.

A first tab 230 is disposed at a first edge 232 of the sheet 210. A second tab 234 is disposed at a second edge 236 of the sheet 210. The second tab 234 is utilized to mount, bind, or affix the foldable article to an object or to a support member. With the foldable article supported at the second edge 236 by the second tab 234, the first tab 230 can be grasped by an individual to fold and to unfold the sheet 210.

Preferably, the sheet 210 and the sleeves are formed of a transparent material such as plastic so that the objects stored therein can be externally viewed. It is noted that the sleeves can be located on either or both sides of the sheet 210.

The foldable article can be utilized in a wallet to contain objects such as a driver's license, an identification card, an insurance card, an automobile registration, pictures, credit cards, and an ATM card. Here, the second tab 234 can be shaped to fit within a sleeve of the wallet.

Figure 14:
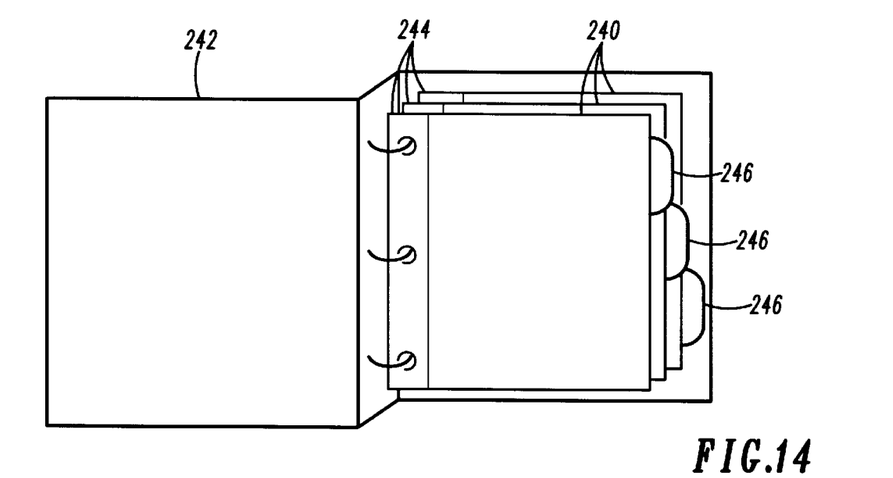
FIG. 14 is a general diagram that illustrates a plurality of foldable articles bound by a multi-ring binder.

FIG. 14 illustrates a plurality of foldable articles 240 bound by a multi-ring binder 242. The foldable articles 240 can include one or more embodiments of a foldable article described with reference to FIG. 12, and/or one or more embodiments of a foldable article described with reference to FIG. 13. Mounting tabs 244 of the foldable articles 240 are mounted to a support member provided by the multi-ring binder 242. Grasping tabs 246 of the foldable articles 240 are staggered to facilitate ease in accessing a desired one of the foldable articles 240.

Embodiments of the foldable article can be utilized to display a variety of information. Examples of the information which can be displayed are given in the copending application entitled "Method, System, and Article of Manufacture for Producing a Network Navigation Device". The foldable article can assume two profiles: (i) an unfolded profile that provides surface areas for supporting all of the information; and (ii) a smaller, folded profile, that provides smaller externally-accessible surfaces for supporting a subset of the information.

Embodiments of the foldable article can be utilized in other applications such as to provide a foldable game board. For example, the foldable article can provide a foldable chess board or checker board.

It is explicitly noted that the teachings of the various embodiments of the present invention can be interchanged and/or combined to form numerous additional embodiments. For example: (i) any of the embodiments can utilize foldable tabs; (ii) sleeves can be included at any portion of the foldable articles described herein (e.g. a sleeve can be associated with at least one of the stiff portions described with reference to FIG. 11); (iii) the embodiments described with reference to FIG. 13 can utilize two tabs for grasping by an individual; (iv) information can be printed on any of the sheets of material; etc.

Thus, there has been described herein several embodiments including preferred embodiments of a foldable display article.

Because the various embodiments of the present invention utilize tabs at different edges of the sheet, they provide a significant improvement in providing a foldable article which is more intuitive to grasp, to unfold, and to fold.

Additionally, the various embodiments of the present invention as herein-described utilize two sets of concertina folds each consisting of an even number of folds to facilitate folding and unfolding using less wrist motion.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. An article comprising:
    a sheet of material having a first edge and a second edge, the first being adjacent to the second edge when the sheet of material is unfolded;
    a first plurality of concertina folds in the sheet of material;
    a second plurality of concertina folds in the sheet of material, the second plurality of concertina folds oriented transverse to the first plurality of concertina folds, wherein the first plurality of concertina folds and the second plurality of concertina folds divide the sheet of material into a plurality of segments including a first corner segment and a second corner segment, the second corner segment diagonally opposite to the first corner segment;
    a first tab which projects beyond the first edge of the sheet of material, the first tab having a width less than a width of the first corner segment, wherein each width is measured parallel to the first edge; and
    a second tab which projects beyond the second edge of the sheet of material, the second tab having a width less than a width of the second corner segment, wherein each width is measured parallel to the second edge.

2. The article of claim 1 wherein, when the sheet of material is unfolded, the first tab projects beyond a linear portion of only the first edge of the sheet of material.

3. The article of claim 2 wherein, when the sheet of material is unfolded, the second tab projects beyond a linear portion of only the second edge of the sheet of material.

4. The article of claim 1 wherein, when the sheet of material is folded, the first tab is opposite the second tab.

5. The article of claim 1 wherein the first plurality of concertina folds consists of an even number of folds and the second plurality of concertina folds consists of an even number of folds.

6. The article of claim 1 wherein the sheet of material is generally rectangular.

7. The article of claim 1 wherein the sheet of material, the first tab, and the second tab are formed of a unitary member.

8. The article of claim 1 wherein the sheet of material, the first tab, and the second tab are formed of the same material.

9. The article of claim 1 wherein the sheet of material comprises paper.

10. The article of claim 1 further comprising a first stiff portion mounted to the first corner segment and a second stiff portion mounted to the second corner segment.

11. The article of claim 10 wherein the first tab and the first stiff portion are formed of a first unitary member, and wherein the second tab and the second stiff portion are formed of a second unitary member.

12. The article of claim 10 wherein the first tab is mounted to the first stiff portion, and wherein the second tab is mounted to the second stiff portion.

13. An article comprising:
    a sheet of material having a first edge and a second edge, the first edge adjacent to the second edge when the sheet of material is unfolded;
    a first plurality of concertina folds in the sheet of material, the first plurality of concertina folds consisting of an even number of folds;
    a second plurality of concertina folds in the sheet of material, the second plurality of concertina folds consisting of an even number of folds, the second plurality of concertina folds oriented transverse to the first plurality of concertina folds, wherein the first plurality of concertina folds and the second plurality of concertina folds divide the sheet of material into a plurality of segments including a first corner segment and a second corner segment, the second corner segment diagonally opposite to the first corner segment;

a first tab which projects beyond only the first edge of the sheet of material when the sheet of material is unfolded, the first tab having a width less than a width of the first corner segment, wherein each width is measured parallel to the first edge; and a second tab which projects beyond only the second edge of the sheet of material when the sheet of material is unfolded, the second tab having a width less than a width of the second corner segment, wherein each width is measured parallel to the second edge.

14. The article of claim 13 wherein the sheet of material is generally rectangular.

15. The article of claim 13 further comprising a first stiff portion mounted to the first corner segment and a second stiff portion mounted to the second corner segment.

16. The article of claim 15 wherein the first tab and the first stiff portion are formed of a first unitary member, and wherein the second tab and the second stiff portion are formed of a second unitary member.

17. The article of claim 15 wherein the first tab is mounted to the first stiff portion, and wherein the second tab is mounted to the second stiff portion.

18. The article of claim 15 wherein the sheet of material has a first surface and a second surface, the first surface having textual information solely in a first language, the second surface having textual information solely in a second language.

\* \* \* \* \*

UNITED STATES PATENT AND TRADEMARK OFFICE
CERTIFICATE OF CORRECTION

PATENT NO. :
DATED       :  5,928,753
INVENTOR(S) :  July 27, 1999

Perttunen et al.

It is certified that error appears in the above-identified patent and that said Letters Patent is hereby corrected as shown below:

Column 10, line 7 after "the first" insert --edge--

Signed and Sealed this

First Day of February, 2000

*Attest:*

Q. TODD DICKINSON

*Attesting Officer*          *Acting Commissioner of Patents and Trademarks*